US012549436B2

(12) United States Patent
Jenkins et al.

(10) Patent No.: US 12,549,436 B2
(45) Date of Patent: Feb. 10, 2026

(54) INTERNET OF THINGS CONFIGURATION USING EYE-BASED CONTROLS

(71) Applicant: International Business Machines Corporation, Armonk, NY (US)

(72) Inventors: Jana H. Jenkins, Raleigh, NC (US); Mohammad Ismail, Toronto (CA); Jothi Subramani, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/398,583

(22) Filed: Aug. 10, 2021

(65) Prior Publication Data

US 2023/0050526 A1 Feb. 16, 2023

(51) Int. Cl.
*H04L 41/0806* (2022.01)
*G06F 3/01* (2006.01)
*G16Y 40/35* (2020.01)

(52) U.S. Cl.
CPC .......... *H04L 41/0806* (2013.01); *G06F 3/013* (2013.01); *G16Y 40/35* (2020.01); *G08C 2201/30* (2013.01); *G08C 2201/93* (2013.01)

(58) Field of Classification Search
None
See application file for complete search history.

(56) References Cited

U.S. PATENT DOCUMENTS

| | | | |
|---|---|---|---|
| 8,952,779 B2* | 2/2015 | Sugaya | H04N 21/4131 340/5.1 |
| 9,430,041 B2* | 8/2016 | Leigh | G06F 3/013 |
| 9,841,811 B2* | 12/2017 | Reiner | A61B 6/465 |
| 9,864,429 B2* | 1/2018 | Lee | G06F 3/0484 |
| 9,977,496 B2* | 5/2018 | Maltz | G06F 3/04845 |
| 10,073,428 B2* | 9/2018 | Bruhn | G05B 15/02 |

(Continued)

FOREIGN PATENT DOCUMENTS

| | | |
|---|---|---|
| CN | 107656505 A | 2/2018 |
| JP | 4956626 B2 | 6/2012 |

OTHER PUBLICATIONS

Bissoli, Alexandre, et al. "A human-machine interface based on eye tracking for controlling and monitoring a smart home using the internet of things." Sensors 19.4 (2019): 859. (Year: 2019).*

(Continued)

*Primary Examiner* — Maria S Ayad
(74) *Attorney, Agent, or Firm* — Anthony M. Pallone (57) ABSTRACT

In an approach to an Internet of Things configuration using eye-based controls, one or more computer processors receive an initiation of eye control of one or more computing devices from a user. One or more computer processors identify an eye gaze direction of the user. Based on the identified eye gaze direction, one or more computer processors determine one or more target devices of the one or more computing devices. One or more computer processors determine one or more activities associated with the one or more target devices. One or more computer processors determine one or more eye control commands associated with the one or more activities. One or more computer processors display the one or more eye control commands associated with the one or more activities in the field of view of the user.

14 Claims, 4 Drawing Sheets

(56) References Cited

U.S. PATENT DOCUMENTS

| | | | |
|---|---|---|---|
| 10,186,086 B2* | 1/2019 | Giraldi | G06F 3/013 |
| 10,203,665 B2* | 2/2019 | Lyman | H04L 12/2829 |
| 10,203,762 B2 | 2/2019 | Bradski | |
| 10,528,130 B2* | 1/2020 | Maltz | G06F 3/013 |
| 10,675,544 B2* | 6/2020 | Stroud | A63F 13/497 |
| 10,915,180 B2* | 2/2021 | Marggraff | G06F 3/0485 |
| 10,990,996 B1* | 4/2021 | Podgorny | H04L 67/535 |
| 11,036,301 B2* | 6/2021 | Matsubara | G06F 3/011 |
| 11,201,758 B2* | 12/2021 | Kim | H04L 12/2829 |
| 2004/0193413 A1* | 9/2004 | Wilson | H04N 13/239 |
| | | | 382/209 |
| 2005/0199783 A1* | 9/2005 | Wenstrand | G06V 40/19 |
| | | | 250/214.1 |
| 2006/0235701 A1* | 10/2006 | Cane | H04N 21/42204 |
| | | | 704/E15.045 |
| 2010/0058252 A1* | 3/2010 | Ko | G06F 3/04883 |
| | | | 715/863 |
| 2012/0194419 A1* | 8/2012 | Osterhout | G02B 27/017 |
| | | | 345/156 |
| 2012/0258436 A1* | 10/2012 | Lee | G09B 19/003 |
| | | | 434/362 |
| 2012/0316011 A1* | 12/2012 | Milosevic | G09B 19/003 |
| | | | 473/450 |
| 2013/0249947 A1 | 9/2013 | Reitan | |
| 2013/0293488 A1* | 11/2013 | Na | G06F 3/038 |
| | | | 345/173 |
| 2014/0204029 A1* | 7/2014 | Lopez | G06F 3/0482 |
| | | | 345/173 |
| 2015/0154001 A1* | 6/2015 | Knox | G06F 3/017 |
| | | | 345/156 |
| 2015/0261293 A1* | 9/2015 | Wilairat | G08C 17/02 |
| | | | 345/156 |
| 2015/0378431 A1* | 12/2015 | Donaldson | G06F 3/04842 |
| | | | 382/103 |
| 2016/0025971 A1* | 1/2016 | Crow | A61B 3/113 |
| | | | 345/156 |
| 2016/0048204 A1* | 2/2016 | Scott | G06F 3/012 |
| | | | 345/156 |
| 2016/0313802 A1* | 10/2016 | Matsubara | G06F 3/0304 |
| 2016/0358383 A1 | 12/2016 | Gauglitz | |
| 2017/0068119 A1* | 3/2017 | Antaki | G06F 3/012 |
| 2017/0109913 A1* | 4/2017 | Behnken | G06F 1/1694 |
| 2017/0192500 A1* | 7/2017 | Hao | G06F 3/04855 |
| 2017/0357434 A1* | 12/2017 | Coffman | G05B 15/02 |
| 2017/0361213 A1* | 12/2017 | Goslin | G06F 3/02 |
| 2018/0286268 A1* | 10/2018 | Ni | G02B 27/017 |
| 2019/0104968 A1* | 4/2019 | Fedele | A61B 5/377 |
| 2019/0311513 A1 | 10/2019 | Han | |
| 2020/0371673 A1 | 11/2020 | Faulkner | |
| 2021/0096726 A1* | 4/2021 | Faulkner | G06F 3/017 |
| 2021/0349534 A1* | 11/2021 | Eil | G06T 19/006 |
| 2021/0405760 A1* | 12/2021 | Schoen | G06F 1/1686 |
| 2022/0019282 A1* | 1/2022 | Zhou | G06F 1/3231 |
| 2022/0121274 A1* | 4/2022 | Aher | G06T 19/003 |
| 2022/0121275 A1* | 4/2022 | Balaji | G06T 19/006 |
| 2022/0121276 A1* | 4/2022 | Saito | G06V 20/20 |
| 2022/0139573 A1* | 5/2022 | Sharifi | G06F 16/3329 |
| | | | 709/223 |
| 2022/0326766 A1* | 10/2022 | Spencer | G06F 3/013 |

OTHER PUBLICATIONS

CAE_ARESAR_with_Hololens2_User_Guide_v1_1 (Year: 2020).*

Heinrich, Florian, et al. "HoloPointer: a virtual augmented reality pointer for laparoscopic surgery training." International journal of computer assisted radiology and surgery 16 (2021): 161-168.— [Published online Oct. 2020] (Year: 2020).*

Authors et al.: Disclosed Anonymously, "Augmented Reality Interface for Visualizing and Interacting with IoT Devices", An IP.com Prior Art Database Technical Disclosure, IP.com No. IPCOM000255233D, IP.com Electronic Publication Date: Sep. 11, 2018, 22 Pages.

* cited by examiner

INTERNET OF THINGS CONFIGURATION USING EYE-BASED CONTROLS

BACKGROUND OF THE INVENTION

The present invention relates generally to the field of augmented reality, and more particularly to an Internet of Things configuration using eye-based controls.

The Internet of Things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

Generally, augmented reality comprises a live, direct (or indirect) view of a physical, real world environment having contents that are augmented, or supplemented, by computer-generated sensory input such as visually perceivable content. In many cases, the augmented reality system aligns the overlaid imagery with specific elements of the physical world. Some augmented reality approaches rely, at least in part, upon a head-mounted display. These head-mounted displays often have the form-factor of a pair of glasses. Such displays place contrived images over a portion, though typically not all of, a user's view of the world. Such head-mounted displays are typically either optical see-through mechanisms or video-based mechanisms.

Augmented reality glasses may provide an enhanced view of the real-world environment by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

Eye tracking is the process of measuring either the point of gaze (where one is looking) or the motion of an eye relative to the head. An eye tracker is a device for measuring eye positions and eye movement. Eye trackers are used in research on the human visual system, in psychology, in cognitive linguistics, in marketing, as an input device for human computer interaction, and in product design. Eye trackers may be incorporated into a variety of user devices, including televisions, computers, mobile devices, such as augmented reality glasses, and tablet computers. Eye tracking may be used to facilitate analysis of user viewing patterns. User viewing patterns can be monitored in certain architectures and tracked to identify preferred categories of content, interests, and the like.

SUMMARY

Embodiments of the present invention disclose a computer-implemented method, a computer program product, and a system for an Internet of Things configuration using eye-based controls. The computer-implemented method may include one or more computer processors receiving an initiation of eye control of one or more computing devices from a user. One or more computer processors identify an eye gaze direction of the user. Based on the identified eye gaze direction, one or more computer processors determine one or more target devices of the one or more computing devices. One or more computer processors determine one or more activities associated with the one or more target devices. One or more computer processors determine one or more eye control commands associated with the one or more activities. One or more computer processors display the one or more eye control commands associated with the one or more activities in the field of view of the user.

DETAILED DESCRIPTION

Currently, there are a plurality of eye-controlled applications, i.e., applications where adjustments or configuration of settings can be performed via one or more eye movements of the user. For example, a user can control a television, share files, etc. Typically, eye-based control can be accomplished within short distances between the eye of the user and the device. If a user has to control a device or perform a set of activities from a distance, then eye-based control is difficult for the devices to track. Further, if multiple users are performing activities with eye-based control, then collaboration and synchronization of the multiple activities may be difficult. In addition, there are instances when a plurality of eye-based controlled activities are performed in a pre-defined sequence, also referred to as a workflow, by either one user or by multiple users.

Embodiments of the present invention recognize that efficiency may be gained by implementing an eye-based control system with a mobile device, such as augmented reality (AR) glasses, that dynamically creates a user interface for eye-based controlled activities, such that the user can perform eye-based control from a distance for a single activity or for a sequence of activities. Embodiments of the present invention also recognize that efficiency may be gained by providing a system that can support collaborative eye-based controlled activities performed by two or more users. Implementation of embodiments of the invention may take a variety of forms, and exemplary implementation details are discussed subsequently with reference to the Figures.

Figure 1:
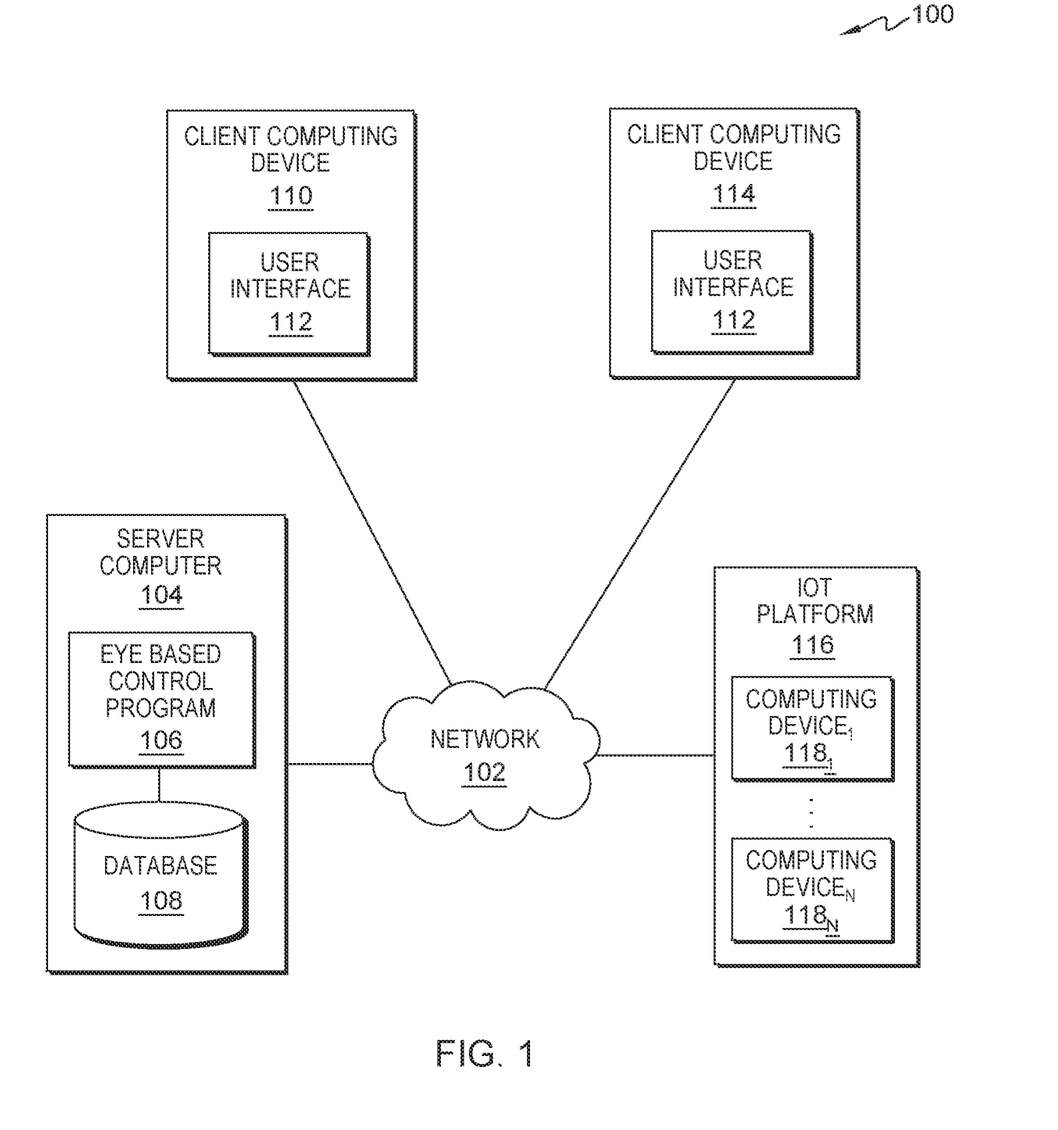
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 110, client computing device 114, and Internet of Things (IoT) platform 116 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, client computing device 114, and IoT platform 116, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110, client computing device 114, IoT platform 116, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes eye-based control program 106 and database 108. Server computer 104 may include internal and external hardware components, as depicted and described in further detail with respect to FIG. 4.

Eye-based control program 106 displays visual guidance to a user in the field of view of a mobile device, such as AR glasses, to guide the user in performing eye-based controlled activities. Eye-based control program 106 also collaborates with surrounding devices in an IoT platform, such as computing device $118_{1-N}$ in IoT platform 116, to identify an activity or a sequence of activities, i.e., a workflow, for the user to perform. Eye-based control program 106 then displays the controls of the activities via a dynamic user interface, such as user interface 112, in a progressive manner, such that the user can identify what type of eye movements, and the sequence of eye movements, that may be inputted to perform the workflow. If multiple users need to perform an eye-based controlled workflow sequence in a collaborative manner, then eye-based control program 106 collaborates with the AR glasses of each user to show the appropriate user interface to each individual, thus, supporting the eye-based activities with appropriate time sequencing relative to each user. Eye-based control program 106 dynamically creates a progressive user interface to perform eye-controlled activities and identifies the sequence based on the user's speed of performing the eye-controlled activities and the time required to perform the eye-controlled activities.

Eye-based control program 106 receives an eye control initiation and identifies the eye gaze direction. Eye-based control program 106 determines one or more target devices and associated activities. Eye-based control program 106 determines whether the associated activities include a workflow sequence. If the associated activities include a workflow sequence, then eye-based control program 106 identifies the sequence and timing of activities, as well as a success criteria. Eye-based control program 106 determines eye control commands and displays the commands in an activity user interface, such as user interface 112. Eye-based control program 106 receives an eye control command from the user and executes the command on the target device. Eye-based control program 106 is depicted and described in further detail with respect to FIG. 2, FIG. 3A, and FIG. 3B.

Database 108 stores information used and generated by eye-based control program 106. In the depicted embodiment, database 108 resides on server computer 104. In another embodiment, database 108 may reside elsewhere within distributed data processing environment 100, provided that eye-based control program 106 has access to database 108. A database is an organized collection of data. Database 108 can be implemented with any type of storage device capable of storing data and configuration files that can be accessed and utilized by eye-based control program 106, such as a database server, a hard disk drive, or a flash memory. Database 108 represents one or more databases that store device specifications, capabilities, settings, and associated activities for computing device $118_{1-N}$. Database 108 may also store one or more workflow sequences for activities performed in association with computing device $118_{1-N}$ such that eye-based control program 106 can re-use the workflow sequences. Database 108 may also store timing associated with workflow sequences, as well as associated timing thresholds.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Eye-based control program 106 enables the authorized and secure processing of personal data. Eye-based control program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Eye-based control program 106 provides information regarding personal data and the nature (e.g., type, scope, purpose, duration, etc.) of the processing. Eye-based control program 106 provides the user with copies of stored personal data. Eye-based control program 106 allows the correction or completion of incorrect or incomplete personal data. Eye-based control program 106 allows the immediate deletion of personal data.

Client computing device 110 and client computing device 114 can each be one or more of a laptop computer, a tablet computer, a smart phone, smart watch, a smart speaker, or any programmable electronic device capable of communicating with various components and devices within distributed data processing environment 100, via network 102. Client computing device 110 and client computing device 114 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display. The head mounted display may take the form-factor of a pair of glasses, such as augmented reality (AR) glasses. In the embodiment where the head mounted display is a pair of AR glasses, the AR glasses can capture eye gaze information from a gaze point tracker, such as a camera associated with client computing device 110 and/or client computing device 114.

In general, client computing device 110 and client computing device 114 each represents one or more programmable electronic devices or combination of programmable electronic devices capable of executing machine readable program instructions and communicating with IoT platform 116 and other computing devices (not shown) within distributed data processing environment 100 via a network, such as network 102. Client computing device 110 and client computing device 114 each includes an instance of user interface 112.

User interface 112 provides an interface between eye-based control program 106 on server computer 104 and a user of client computing device 110 and/or client computing device 114. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of client computing device 110 and/or client computing device 114 to interact with eye-based control program 106 to configure and/or adjust one or more settings of computing device $118_{1-N}$ of IoT platform 116.

Internet of Things (IoT) platform 116 is a suite of components that enable a) deployment of applications that monitor, manage, and control connected devices and sensors; b) remote data collection from connected devices; and c) independent and secure connectivity between devices. The components may include, but are not limited to, a hardware architecture, an operating system, and/or a runtime library (not shown). In the depicted embodiment, IoT platform 116 includes computing device $118_{1-N}$. In another embodiment, IoT platform 116 may include a plurality of other connected sensors and computing devices.

Computing device $118_{1-N}$, hereinafter computing device(s) 118, are a plurality of smart devices that can receive and act upon commands issued by the user of client computing device 110 and/or client computing device 114 via user interface 112. As used herein, N represents a positive integer, and accordingly the number of scenarios implemented in a given embodiment of the present invention is not limited to those depicted in FIG. 1. For example, computing device(s) 118 may include security devices, such as alarms, smoke detectors, and video doorbells. In another example, computing device(s) 118 may include a climate control system, various appliances, and electronic devices. In yet another example, computing device(s) 118 may include a virtual assistant. In an embodiment, computing device(s) 118 include one or more sensors. In an embodiment, one or more devices included in IoT platform 116 may include a machine learning component that can learn a user's preferences over time by observing the user's actions. For example, an intelligent home climate control system may detect a pattern such as the user setting a thermostat for 65 degrees Fahrenheit in the mornings on Monday through Friday, when the user is not at home, and adjusting the thermostat to 70 degrees Fahrenheit for the rest of the time. Based on this pattern, the IoT device can set the thermostat without user intervention.

Figure 2:
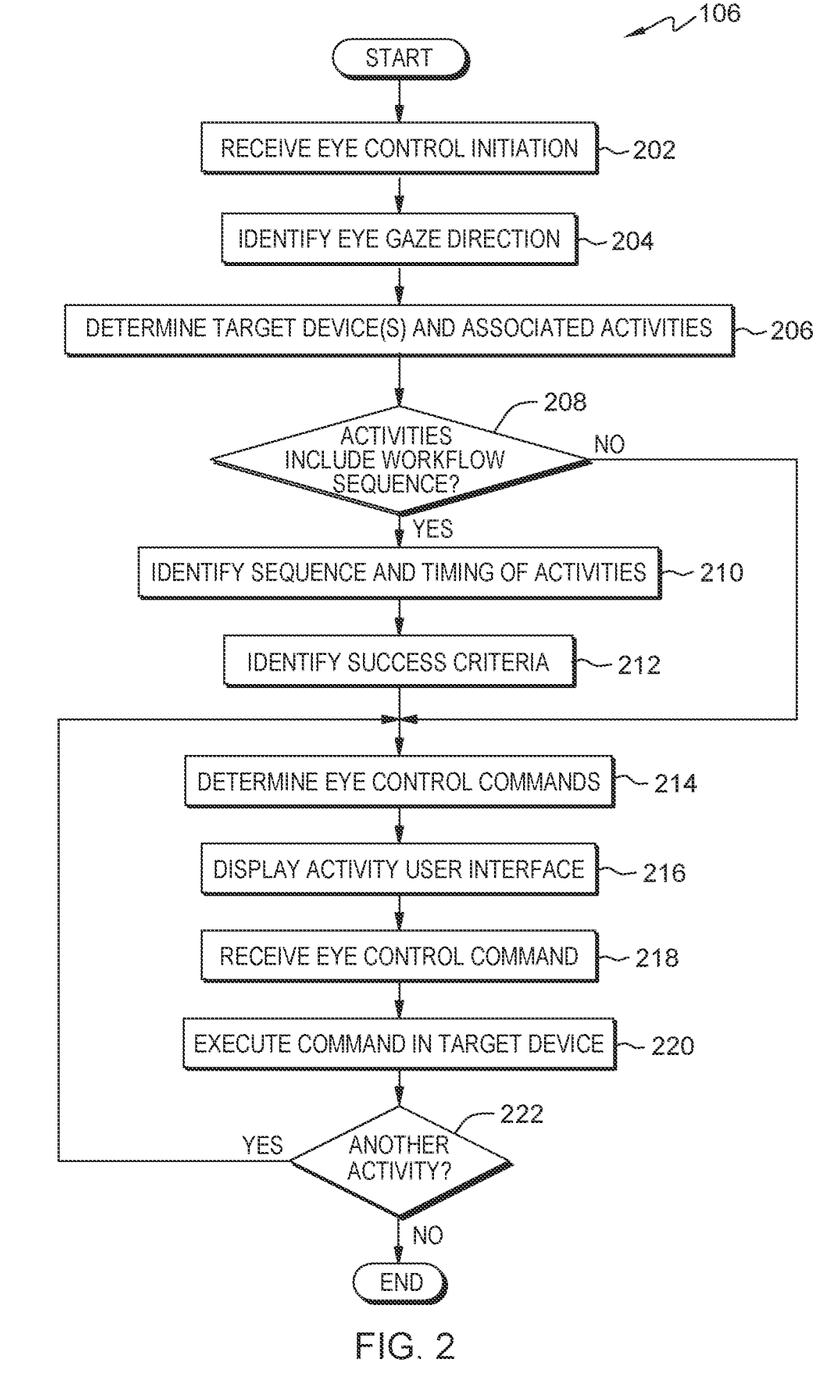
FIG. 2 is a flowchart depicting operational steps of an eye-based control program, on a server computer within the distributed data processing environment of FIG. 1, for configuring Internet of Things devices, in accordance with an embodiment of the present invention.

FIG. 2 is a flowchart depicting operational steps of eye-based control program 106, on server computer 104 within distributed data processing environment 100 of FIG. 1, for configuring IoT devices, in accordance with an embodiment of the present invention.

Eye-based control program 106 receives eye control initiation (step 202). In an embodiment, when a user of client computing device 110 and/or client computing device 114 decides to use eye-based control program 106 to configure settings on one or more of computing device(s) 118, the user initiates eye-based control program 106. In an embodiment where client computing device 110 is a pair of AR glasses, eye-based control program 106 receives eye control initiation when the user puts on the AR glasses. In another embodiment where client computing device 110 is a pair of AR glasses, eye-based control program 106 receives eye control initiation when the user turns on the AR glasses. In yet another embodiment, eye-based control program 106 receives eye control initiation when the user speaks a command (e.g., trigger word/phrase or wake word/phrase) into a microphone associated with client computing device 110 (not shown), and eye-based control program 106 determines, using one or more natural language processing (NLP) techniques, that the command is to initiate eye control of a device, such as one or more of computing device(s) 118.

Eye-based control program 106 identifies eye gaze direction (step 204). In an embodiment, eye-based control program 106 identifies the eye gaze direction of the user in an effort to determine which device of computing device(s) 118 the user wants to control. In an embodiment, an eye gaze tracker is integrated into client computing device 110 and client computing device 114. For example, client computing device 110 may include one or more cameras that monitor the eyes of the user, and, based on the images of the eyes, eye-based control program 106 identifies the direction of the eye gaze of the user.

Eye-based control program 106 determines target device(s) and associated activities (step 206). In an embodiment, based on the identified eye gaze direction of the user, eye-based control program 106 determines which of the one or more computing device(s) 118 in IoT platform 116 are target devices. In an embodiment, eye-based control program 106 may determine that the user is looking at more than one of computing device(s) 118, and therefore desires to configure settings in each of the devices to which the eye gaze is directed. In an embodiment, eye-based control program 106 communicates with each of the target devices to determine what activities are associated with that device and, therefore, are available to configure or adjust with eye control. For example, if computing device $118_1$ is a television, then the associated activities may include adjusting the volume higher or lower, adjusting the brightness higher or lower, adjusting the resolution of the image on the screen, etc. Other examples of activities associated with one or more of computing device(s) 118 include, but are not limited to, sharing files, gaming, browser activity, collaborative editing, etc. In an embodiment, eye-based control program 106 identifies the context of one or more of computing device(s) 118 to assist with identifying associated activities. In an embodiment, eye-based control program 106 queries each device directly for associated activities. In another embodiment, eye-based control program 106 queries database 108 for activities associated with each device.

Eye-based control program 106 determines whether the associated activities include a workflow sequence (decision block 208). In an embodiment, the user of client computing device 110 wants to perform more than one activity, either with multiple eye-based activities on one device, or one or more eye-based activities on multiple devices, within a threshold period of time. In another embodiment, multiple users, e.g., the user of client computing device 110 and the user of client computing device 114, want to perform one or more eye-based activities on one or more target devices within a threshold period of time. In the embodiments, eye-based control program 106 determines that the activities associated with the target devices are to be performed in an order or sequence, also called a workflow sequence. For example, if multiple users are logging into a gaming device, then the user acting as the host logs in first, followed by the other users.

If eye-based control program 106 determines the associated activities include a workflow sequence ("yes" branch, decision block 208), then eye-based control program 106 identifies a sequence and timing of the activities (step 210). In an embodiment with multiple activities in a workflow sequence, eye-based control program 106 identifies the sequence of the activities. In one embodiment, eye-based control program 106 identifies the sequence of activities based on the order in which the user gazed at the target devices. For example, if eye-based control program 106 determines the direction of the gaze of the user was first on the television and then on the sound system, then eye-based control program 106 identifies the sequence as performing one or more activities associated with the television followed by performing one or more activities associated with the sound system. In another embodiment, eye-based control program 106 identifies the sequence based on historical data stored in database 108. For example, if multiple users are logging into a gaming system, eye-based control program 106 may identify the sequence of the users based on the sequence used the last time the same group of users logged into the gaming system. In another embodiment, eye-based control program 106 identifies the sequence of the activities based on an implied priority. For example, if multiple users are watching a movie on the television at the home of the user of client computing device 110, then activities associated with the television requested by the user of client computing device 110 may take priority over activities requested by the other users since the television belongs to the user of client computing device 110.

In an embodiment, eye-based control program 106 identifies the timing associated with each of the activities included in the workflow sequence. For example, eye-based control program 106 may establish a time limit for performing each activity, such that the user has to perform the eye motion associated with the activity within a threshold period of time, otherwise eye-based control program 106 cancels the activity and the user has to request the activity again. In another example, eye-based control program 106 may identify a total time expected for one or more users to perform the sequence of activities based on historical data stored in database 108. Eye-based control program 106 may monitor the time, and if the total time differs from the expected time by a threshold amount of time, then eye-based control program 106 may store a new expected time in database 108.

Eye-based control program 106 identifies success criteria (step 212). In an embodiment, eye-based control program 106 identifies criteria associated with each activity such that eye-based control program 106 can determine if each activity is performed successfully and, therefore, advance the workflow sequence to the subsequent step. For example, as discussed above, eye-based control program 106 may identify a success criteria as detecting an activity performed by a user within a threshold amount of time. In another example, eye-based control program 106 may identify a success criteria as detecting the expected change to a setting configuration associated with one of computing device(s) 118.

Responsive to identifying success criteria for the sequence, or if eye-based control program 106 determines the associated activities do not include a workflow sequence ("no" branch, decision block 208), then eye-based control program 106 determines eye control commands to be used or displayed in an activity user interface (step 214). In an embodiment, eye-based control program 106 determines a type of eye movement associated with an activity that, when executed by the user, issues a command that causes the desired adjustment or configuration of the one or more target devices. For example, eye-based control program 106 determines that open eyes increase the volume of the television and closed eyes decrease the volume of the television. Other eye movements that eye-based control program 106 associates with a command include, but are not limited to, a degree of eye opening and/or closing, a speed of eye opening and/or closing, a pattern of eye opening and/or closing, a speed of blinking, a count of blinks, the use of a left or right eye individually, etc. In an embodiment, eye-based control program 106 determines a unique eye control command for each activity associated with each device of computing device(s) 118.

Eye-based control program 106 displays the activity user interface (step 216). In an embodiment, based on the target device, associated activities, and determined eye control commands, eye-based control program 106 dynamically creates a display of eye control commands, via user interface 112, in the field of view of the user of client computing device 110 and/or the user of client computing device 114, providing information on how to perform the activity. In an embodiment where the user wants to perform a single activity on a single device, eye-based control program 106 displays the activity user interface for that device. For example, if the user wants to adjust the volume of the television, then eye-based control program 106 displays a command option for increasing the volume, such as eyes open, and a command option for decreasing the volume, such as eyes closed. In an embodiment, eye-based control program 106 displays a list of target devices included in computing device(s) 118 and indicates to the user to choose a device for which the user wants eye control commands. In an embodiment with multiple users, eye-based control program 106 displays eye control commands, via user interface 112, in the field of view of each of the users in the associated client computing device, i.e., AR glasses, such as displaying appropriate commands in client computing device 114 in addition to client computing device 110.

In an embodiment where eye-based control program 106 determined the activities include a workflow sequence, eye-based control program 106 displays the eye control commands in the order of the sequence, dynamically updating user interface 112 as each command is received. Continuing a previous example, if the identified sequence is performing an activity associated with the television followed by performing an activity associated with the sound system, then eye-based control program 106 displays the commands associated with the television activity first, followed by the commands associated with the sound system. In another embodiment, eye-based control program 106 displays a list of commands in the order in which the commands are to be performed. In an embodiment, eye-based control program 106 determines that the user successfully completed a first activity in the sequence, based on previously identified success criteria, prior to displaying the eye control commands associated with the next activity. In an embodiment, if the activities in the workflow sequence are associated with different devices, then eye-based control program 106 displays the eye control commands for the first activity, and, prior to displaying the commands for the next device, eye-based control program 106 indicates an eye gaze direction in which the user should focus prior to displaying the eye control commands for the next device.

Eye-based control program 106 receives the eye control commands (step 218). In an embodiment, when the user performs one or more eye control commands, as displayed via user interface 112, eye-based control program 106 receives the commands. In an embodiment, eye-based control program 106 receives the eye control commands via an eye gaze tracker integrated into client computing device 110 that can detect the eye motion of the user, then eye-based control program 106 translates the eye motion to determine the received command. In an embodiment where multiple users are performing a workflow sequence, eye-based control program 106 receives the eye control commands from each of the users, either simultaneously, or in the order of the sequence.

Eye-based control program 106 executes the eye control commands in the target device (step 220). In an embodiment, based on the received eye control commands, eye-based control program 106 determines the target device for the commands and executes the eye control commands in the target device. For example, if eye-based control program 106 displayed eye control command options for the television of eyes open for increasing the volume and eyes closed for decreasing the volume, and eye-based control program 106 received the command of eyes open, then eye-based control program 106 increases the volume of the television. In an embodiment, eye-based control program 106 communicates with the target device and shares the command for execution in the device.

Eye-based control program 106 determines whether there is another activity (decision block 222). In an embodiment, eye-based control program 106 monitors the eye gaze direction of the user to determine whether the user is selecting another target device to perform another activity. In another embodiment, where a workflow sequence is included, eye-based control program 106 monitors the one or more users performing the activities in the workflow sequence to determine if the sequence is complete, or if there is another activity included in the workflow. If eye-based control program 106 determines there is another activity ("yes" branch, decision block 222), then eye-based control program 106 returns to step 214 to determine additional eye control commands. If eye-based control program 106 determines there is not another activity ("no" branch, decision block 222), then eye-based control program 106 ends execution.

Figure 3A:
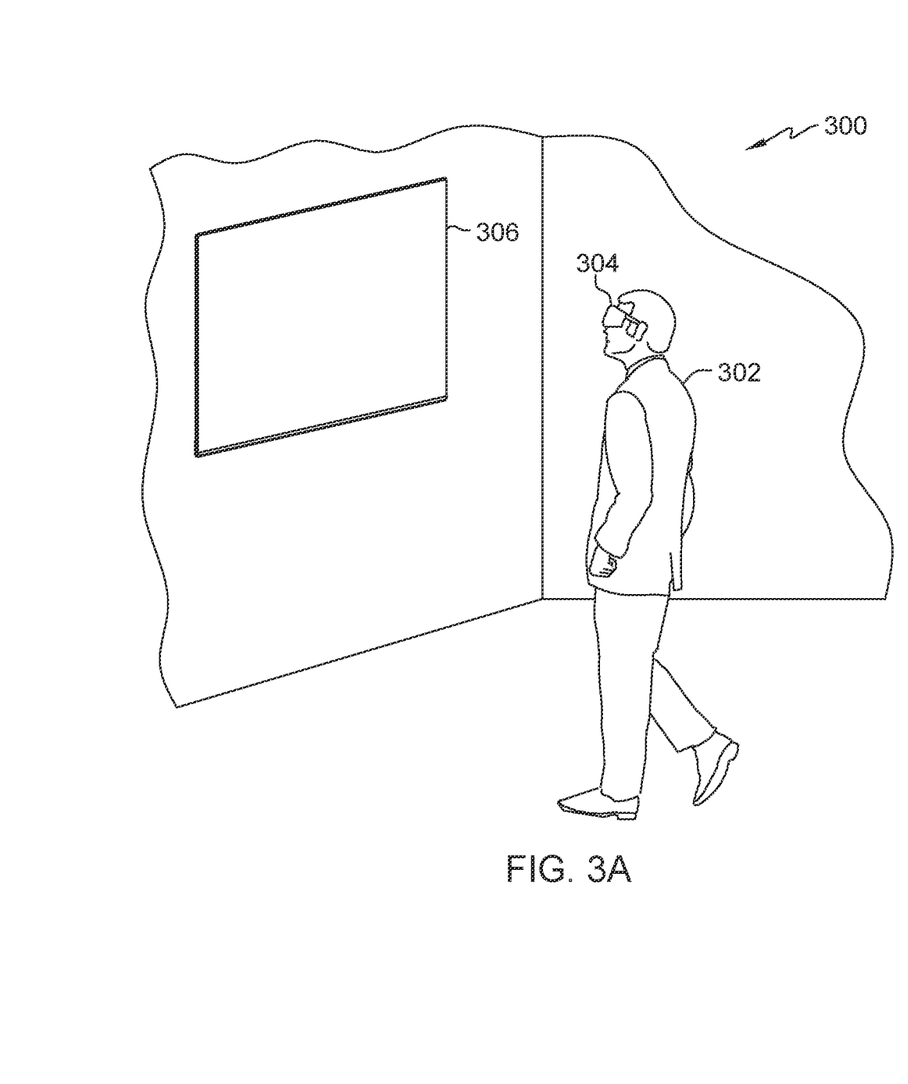
FIG. 3A illustrates an example usage of the eye-based control program, in accordance with an embodiment of the present invention.

FIG. 3A illustrates example 300 indicating a usage of eye-based control program 106, in accordance with an embodiment of the present invention. FIG. 3A includes user 302 which represents the user of client computing device 110 of FIG. 1. FIG. 3A also includes AR glasses 304 which represent an example of client computing device 110 of FIG. 1. In addition, FIG. 3A includes television 306 which represents an example of computing device $118_1$ of FIG. 1. Eye-based control program 106 detects the eye gaze direction of user 302 via AR glasses 304 and determines the target device is television 306. In the example, user 302 wants to adjust the volume of television 306.

Figure 3B:
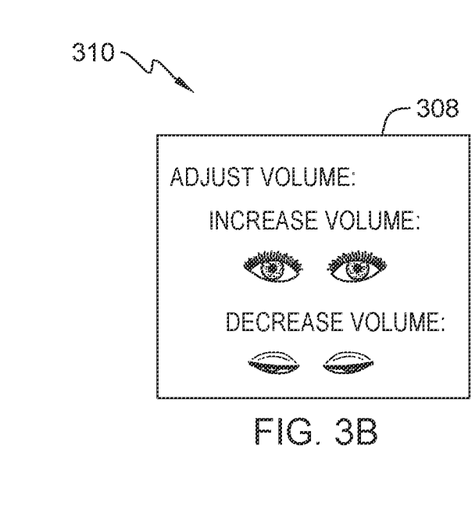
FIG. 3B illustrates an example user interface created by the eye-based control program, in accordance with an embodiment of the present invention.

FIG. 3B illustrates example 310 of user interface 112 created by eye-based control program 106, in accordance with an embodiment of the present invention. FIG. 3B includes user interface 308 which represents an example of user interface 112 of FIG. 1. After determining the target device is television 306, eye-based control program 106 dynamically creates user interface 308 to display the options for eye control commands for adjusting the volume of television 306. In the example, eye-based control program 106 indicates that to increase the volume, the user's eyes should be open and to decrease the volume, the user's eyes should be closed.

Figure 4:
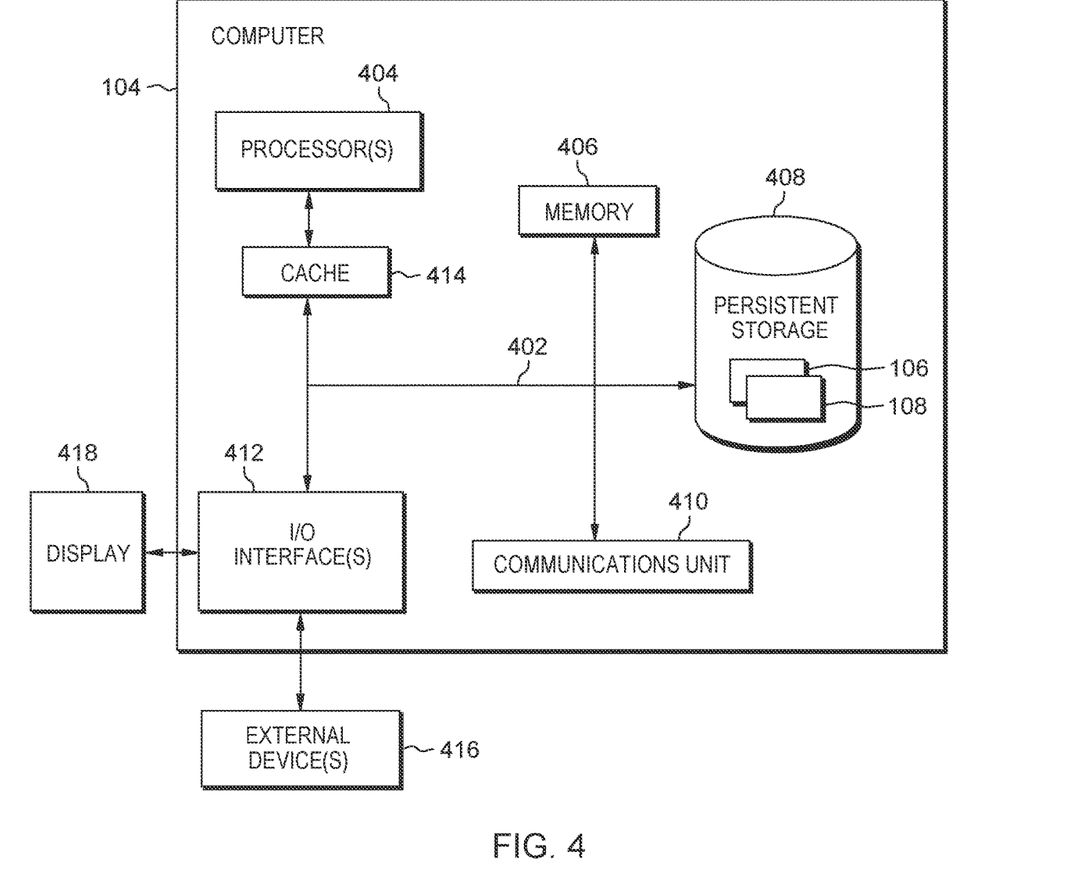
FIG. 4 depicts a block diagram of components of the server computer executing the eye-based control program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., eye-based control program 106 and database 108, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 110, client computing device 114, and IoT platform 116. In these examples, communications unit 410 includes one or more network interface cards. Communications unit 410 may provide communications through the use of either or both physical and wireless communications links. Eye-based control program 106 and database 108, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., eye-based control program 106 and database 108 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, an initiation of eye control of one or more computing devices from a user, wherein receiving the initiation of eye control includes the user putting on augmented reality glasses;
    identifying, by the one or more computer processors, an eye gaze direction of the user;
    based on the identified eye gaze direction, determining, by the one or more computer processors, one or more target devices of the one or more computing devices;
    querying, by the one or more computer processors, each of the one or more target devices for one or more activities associated with the one or more target devices;
    determining, by the one or more computer processors, that the one or more activities include a workflow sequence performed in a collaborative manner by multiple users, wherein the multiple users include the user;
    determining, by the one or more computer processors, one or more eye control commands associated with the one or more activities, wherein the one or more eye control commands are determined by types of eye movements of each of the multiple users, the eye movement comprising a degree of eye opening, a degree of eye closing, and a speed of blinking;
    identifying, by the one or more computer processors, a sequence and a timing of the one or more activities within the workflow sequence based on an implied priority among the multiple users, wherein the implied priority is based on ownership of a device of the one or more target devices and wherein an order associated with the workflow sequence is based on the implied priority; and
    displaying, by the one or more computer processors, the one or more eye control commands associated with the one or more activities in a field of view of each of the multiple users via user interfaces of respective augmented reality glasses of each of the multiple users, wherein the displaying is in the order of the workflow sequence and also provides information on how to perform the one or more activities comprising depictions of the one or more eye control commands associated with the one or more activities.

2. The computer-implemented method of claim 1, further comprising:
    receiving, by the one or more computer processors, at least one of the one or more eye control commands from the multiple users in the order of the workflow sequence; and
    executing, by the one or more computer processors, the at least one of the one or more eye control commands in an associated target device.

3. The computer-implemented method of claim 1, further comprising:
    identifying, by the one or more computer processors, a success criteria for completion of a first activity of the one or more activities in the sequence;

based on the success criteria, determining, by the one or more computer processors, that the first activity is successfully completed; and responsive to determining that the first activity is successfully completed, displaying, by the one or more computer processors, in the user interfaces of the respective augmented reality glasses, the eye control command associated with a second activity of the one or more activities in the order associated with the workflow sequence.

4. The computer-implemented method of claim 3, wherein the success criteria includes detecting an activity performed by the user within a threshold amount of time.

5. The computer-implemented method of claim 1, wherein identifying the timing of the one or more activities in the sequence further comprises:

identifying a total time expected for the multiple users to perform the sequence of the one or more activities based on historical data;

monitoring, by the one or more computer processors, a first time for the multiple users to perform the sequence of the one or more activities;

determining, by the one or more computer processors, that the first time differs from the total time expected by a threshold amount of time; and based on the first time, storing, by the one or more computer processors, a new expected total time.

6. The computer-implemented method of claim 1, wherein the one or more activities associated with the one or more target devices are settings available to configure using eye control.

7. A computer program product comprising:

one or more computer-readable storage media and program instructions collectively stored on the one or more computer-readable storage media, the stored program instructions comprising:

program instructions to receive an initiation of eye control of one or more computing devices from a user, wherein receiving the initiation of eye control includes the user putting on augmented reality glasses;

program instructions to identify an eye gaze direction of the user;

based on the identified eye gaze direction, program instructions to determine one or more target devices of the one or more computing devices;

program instructions to query each of the one or more target devices for one or more activities associated with the one or more target devices;

program instructions to determine that the one or more activities include a workflow sequence performed in a collaborative manner by multiple users, wherein the multiple users include the user;

program instructions to determine one or more eye control commands associated with the one or more activities, wherein the one or more eye control commands are determined by types of eye movements of each of the multiple users, the eye movement comprising a degree of eye opening, a degree of eye closing, and a speed of blinking;

program instructions to identify a sequence and a timing of the one or more activities within the workflow sequence based on an implied priority among the multiple users, wherein the implied priority is based on ownership of a device of the one or more target devices and wherein an order associated with the workflow sequence is based on the implied priority; and program instructions to display the one or more eye control commands associated with the one or more activities in a field of view of each of the multiple users via user interfaces of respective augmented reality glasses of each of the multiple users, wherein the displaying is in the order of the workflow sequence and also provides information on how to perform the one or more activities comprising depictions of the one or more eye control commands associated with the one or more activities.

8. The computer program product of claim 7, the stored program instructions further comprising:

program instructions to receive at least one of the one or more eye control commands from the multiple users in the order of the workflow sequence; and program instructions to execute the at least one of the one or more eye control commands in an associated target device.

9. The computer program product of claim 7, wherein the program instructions to identify the timing of the one or more activities in the sequence further comprise:

program instructions to identify a total time expected for the multiple users to perform the sequence of the one or more activities based on historical data;

program instructions to monitor a first time for the multiple users to perform the sequence of the one or more activities;

program instructions to determine that the first time differs from the total time expected by a threshold amount of time; and based on the first time, program instructions to store a new expected total time.

10. The computer program product of claim 7, wherein the one or more activities associated with the one or more target devices are settings available to configure using eye control.

11. A computer system comprising:

one or more computer processors;

one or more computer-readable storage media;

program instructions collectively stored on the one or more computer-readable storage media for execution by at least one of the one or more computer processors, the stored program instructions comprising:

program instructions to receive an initiation of eye control of one or more computing devices from a user, wherein receiving the initiation of eye control includes the user putting on augmented reality glasses;

program instructions to identify an eye gaze direction of the user;

based on the identified eye gaze direction, program instructions to determine one or more target devices of the one or more computing devices;

program instructions to query each of the one or more target devices for one or more activities associated with the one or more target devices;

program instructions to determine that the one or more activities include a workflow sequence performed in a collaborative manner by multiple users, wherein the multiple users include the user;

program instructions to determine one or more eye control commands associated with the one or more activities within the workflow sequence based on an implied priority among the multiple users, wherein the implied priority is based on ownership of a device of the one or more target devices and wherein an order associated with the workflow sequence is based on the implied priority; and program instructions to identify a sequence and a timing of the one or more activities within the workflow sequence based on an implied priority among the multiple users, wherein the implied priority is based on ownership of a device of the one or more target devices and wherein an order associated with the workflow sequence is based on the implied priority; and program instructions to display the one or more eye control commands associated with the one or more activities in a field of view of each of the multiple users via user interfaces of respective augmented reality glasses of each of the multiple users, wherein the displaying is in the order of the workflow sequence and also provides information on how to perform the one or more activities comprising depictions of the one or more eye control commands associated with the one or more activities.

12. The computer system of claim 11, the stored program instructions further comprising:

program instructions to receive at least one of the one or more eye control commands from the multiple users in the order of the workflow sequence; and program instructions to execute the at least one of the one or more eye control commands in an associated target device.

13. The computer system of claim 11, wherein the program instructions to identify the timing of the one or more activities in the sequence further comprise:

program instructions to identify a total time expected for the multiple users to perform the sequence of the one or more activities based on historical data;

program instructions to monitor a first time for the multiple users to perform the sequence of the one or more activities;

program instructions to determine that the first time differs from the total time expected by a threshold amount of time; and based on the first time, program instructions to store a new expected total time.

14. The computer system of claim 11, wherein the one or more activities associated with the one or more target devices are settings available to configure using eye control.

* * * * *